United States Patent
Niu et al.

(10) Patent No.: US 6,263,195 B1
(45) Date of Patent: Jul. 17, 2001

(54) WIDEBAND PARALLEL PROCESSING DIGITAL TUNER

(75) Inventors: Edward L. Niu, Redondo Beach; Sam H. Liu, Los Angeles; Gregory S. Caso, Hermosa Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/249,904

(22) Filed: Feb. 12, 1999

(51) Int. Cl.[7] ....................................................... H03K 9/00
(52) U.S. Cl. ...................... 455/150.1; 455/339; 375/347; 375/350
(58) Field of Search .............................. 455/150.1, 168.1, 455/334, 339; 375/316, 347, 350

(56) References Cited

U.S. PATENT DOCUMENTS

| | | | |
|---|---|---|---|
| 5,577,031 | * 11/1996 | Smith | 370/58 |
| 5,590,156 | * 12/1996 | Carney | 375/316 |
| 5,592,480 | * 1/1997 | Carney et al. | 370/347 |
| 6,011,785 | * 1/2000 | Carney et al. | 370/330 |
| 6,134,229 | * 10/2000 | Schwaller et al. | 370/336 |
| 6,147,713 | * 11/2000 | Robbins et al. | 348/555 |

* cited by examiner

*Primary Examiner*—Daniel Hunter
*Assistant Examiner*—Thuan T. Nguyen
(74) *Attorney, Agent, or Firm*—Robert W. Keller

(57) ABSTRACT

A wideband digital tuner (14') has an analog front-end section (10), a high speed analog-to-digital converter (12), demultiplexer (13) and a plurality of filters ($34_1$–$34_2$) arranged in a parallel input architecture to process wideband digital data received at extremely high sampling rates, such as at 2 Gsps (giga-samples per second). The tuner greatly attenuates an undesired spectral half of the wide bandwidth digital spectrum of the incoming digital signal using a complex band-pass filter, such as a Hilbert Transform filter. The tuner places the remaining half of the wide bandwidth digital spectrum of the incoming digital signal at complex baseband and down samples by 2. The architecture of the tuner can be partitioned into two separate halves which are hardware copies of each other.

20 Claims, 17 Drawing Sheets

```
nero% parks
  Filter Types
    1 - Bandpass (and Lowpass)
    2 - Differentiator
    3 - Hilbert transform
    4 - Read grid from file
  Enter Type : 1
  Sampling Frequency   : 960
  Number of Pass/Stop Bands : 2
  Band Edges (min, max) : 0,160,320,480
  Response for Each Band : 1,0
  Weighting Function for Each Band : 1,1
  Grid Factor (nominal=16) : 16
  Filter Length (taps) : 15
  Setting up grid...
  Initializing extremal frequencies...
  Performing Remez exchange algorithm...
  Calculating impulse response...
  *********************************
  Finite Impulse Response (FIR)
  Linear Phase Digital Filter Design
  Using Remez Exchange Algorithm
  Bandpass Filter
  Filter Length =   15
                        Band  1        Band  2        Band
  Lower Band Edge    0.000000000    0.333333343
  Upper Band Edge    0.166666672    0.500000000
  Desired Value      1.000000000    0.000000000

Weighting          1.000000000    1.000000000
  Deviation          0.003510498    0.003510498
  Deviation in dB    0.030438203  -49.092628479

Save Filter? y(1), n(0) : 0
  Float,       Rip= 0.0000, Rip= 0.0000, Rip= 0.0000
  Bits Start : 0
  Another Filter? y(1), n(0) : 1
  Filter Length (taps) : 19
  Setting up grid...
  Initializing extremal frequencies...
  Performing Remez exchange algorithm...
  Calculating impulse response...
  *********************************
  Finite Impulse Response (FIR)
  Linear Phase Digital Filter Design
  Using Remez Exchange Algorithm
  Bandpass Filter
  Filter Length =   19
                        Band  1        Band  2        Band
  Lower Band Edge    0.000000000    0.333333343
  Upper Band Edge    0.166666672    0.500000000
  Desired Value      1.000000000    0.000000000

Weighting          1.000000000    1.000000000
  Deviation          0.001053912    0.001053912
  Deviation in dB    0.009149494  -59.543910980
```

FIG. 5

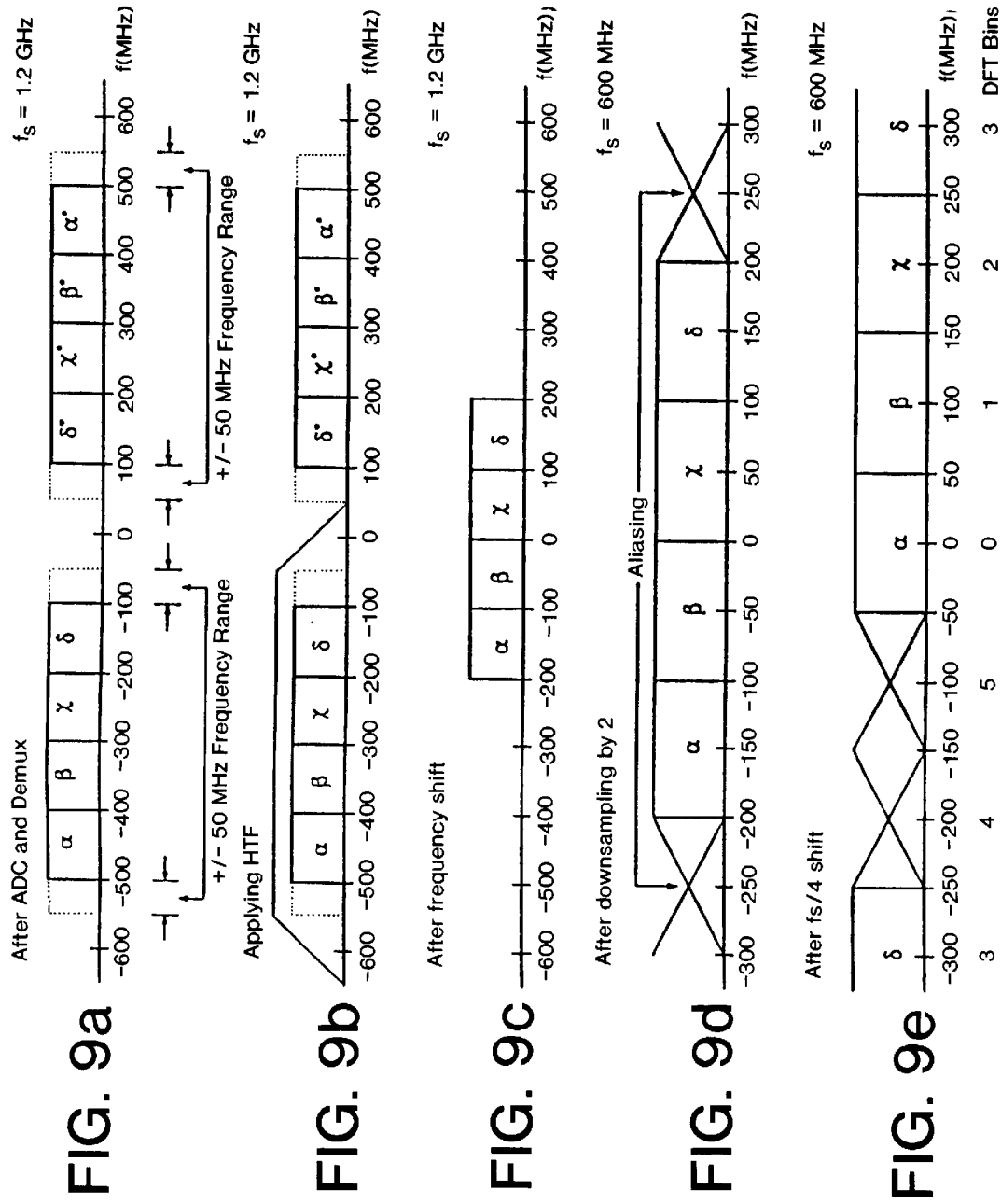

```
nero% parks
  Filter Types
    1 - Bandpass (and Lowpass)
    2 - Differentiator
    3 - Hilbert transform
    4 - Read grid from file
Enter Type : 3
Sampling Frequency   : 960
Number of Pass/Stop Bands : 3
Band Edges (min, max) : 0,0,80,400,480,480
Response for Each Band : 0,1,0
Weighting Function for Each Band : 1,1,1
Grid Factor (nominal=16) : 16
Filter Length (taps) : 19
Setting up grid...
Initializing extremal frequencies...
Performing Remez exchange algorithm...
Calculating impulse response...
****************************************
Finite Impulse Response (FIR)
Linear Phase Digital Filter Design
Using Remez Exchange Algorithm
Hilbert Transformer
Filter Length = 19
```

|  | Band 1 | Band 2 | Band 3 | Band |
|---|---|---|---|---|
| Lower Band Edge | 0.000000000 | 0.083333336 | 0.500000000 |  |
| Upper Band Edge | 0.000000000 | 0.416666657 | 0.500000000 |  |
| Desired Value | 0.000000000 | 1.000000000 | 0.000000000 |  |
| Weighting | 1.000000000 | 1.000000000 | 1.000000000 |  |
| Deviation | 0.002107411 | 0.002107411 | 0.002107411 |  |
| Deviation in dB | -53.525012970 | 0.018285226 | -53.525012970 |  |

FIG. 10

```
nero% parks
  Filter Types
    1 - Bandpass (and Lowpass)
    2 - Differentiator
    3 - Hilbert transform
    4 - Read grid from file
Enter Type : 3
Sampling Frequency   : 960
Number of Pass/Stop Bands : 3
Band Edges (min, max) : 0,0,50,430,480,480
Response for Each Band : 0,1,0
Weighting Function for Each Band : 1,1,1
Grid Factor (nominal=16) : 16
Filter Length (taps) : 19
Setting up grid...
Initializing extremal frequencies...
Performing Remez exchange algorithm...
Calculating impulse response...
****************************************
Finite Impulse Response (FIR)
Linear Phase Digital Filter Design
Using Remez Exchange Algorithm
```

FIG. 11a

```
Hilbert Transformer
 Filter Length =   19
                    Band   1           Band   2           Band   3          Band
 Lower Band Edge    0.000000000        0.052083332        0.500000000
 Upper Band Edge    0.000000000        0.447916657        0.500000000
 Desired Value      0.000000000        1.000000000        0.000000000

Weighting          1.000000000        1.000000000        1.000000000
 Deviation          0.019578451        0.019578451        0.019578451
 Deviation in dB  -34.164432526        0.168413013      -34.164432526

Save Filter? y(1), n(0) : 0
Float,     Rip= 0.0000, Rip= 0.0000, Rip= 0.0000
Bits Start : 0
Another Filter? y(1), n(0) : 1
Filter Length (taps) : 23
Setting up grid...
Initializing extremal frequencies...
Performing Remez exchange algorithm...
Calculating impulse response...
*********************************
Finite Impulse Response (FIR)
Linear Phase Digital Filter Design
Using Remez Exchange Algorithm
Hilbert Transformer
 Filter Length =   23
                    Band   1           Band   2           Band   3          Band
 Lower Band Edge    0.000000000        0.052083332        0.500000000
 Upper Band Edge    0.000000000        0.447916657        0.500000000
 Desired Value      0.000000000        1.000000000        0.000000000

Weighting          1.000000000        1.000000000        1.000000000
 Deviation          0.009308033        0.009308033        0.009308033
 Deviation in dB  -40.622840881        0.080474138      -40.622840881

Save Filter? y(1), n(0) : 0
Float,     Rip= 0.0000, Rip= 0.0000, Rip= 0.0000
Bits Start : 0
Another Filter? y(1), n(0) : 1
Filter Length (taps) : 27
Setting up grid...
Initializing extremal frequencies...
Performing Remez exchange algorithm...
Calculating impulse response...
*********************************
```

FIG. 11b

```
Finite Impulse Response (FIR)
Linear Phase Digital Filter Design
Using Remez Exchange Algorithm
Hilbert Transformer
Filter Length =  27
                      Band  1           Band  2           Band  3        Band
Lower Band Edge    0.000000000       0.052083332       0.500000000
Upper Band Edge    0.000000000       0.447916657       0.500000000
Desired Value      0.000000000       1.000000000       0.000000000

Weighting          1.000000000       1.000000000       1.000000000
Deviation          0.004451294       0.004451294       0.004451294
Deviation in dB  -47.030273438       0.038577486     -47.030273438

Save Filter? y(1), n(0) : 0
Float,      Rip= 0.0000, Rip= 0.0000, Rip= 0.0000
Bits Start : 0
Another Filter? y(1), n(0) : 1
Filter Length (taps) : 31
Setting up grid...
Initializing extremal frequencies...
Performing Remez exchange algorithm...
Calculating impulse response...
*********************************
Finite Impulse Response (FIR)
Linear Phase Digital Filter Design
Using Remez Exchange Algorithm
Hilbert Transformer
Filter Length =  31
                      Band  1           Band  2           Band  3        Band
Lower Band Edge    0.000000000       0.052083332       0.500000000
Upper Band Edge    0.000000000       0.447916657       0.500000000
Desired Value      0.000000000       1.000000000       0.000000000

Weighting          1.000000000       1.000000000       1.000000000
Deviation          0.002141741       0.002141741       0.002141741
Deviation in dB  -53.384662628       0.018582800     -53.384662628

Save Filter? y(1), n(0) : 0
Float,      Rip= 0.0000, Rip= 0.0000, Rip= 0.0000
Bits Start : 0
Another Filter? y(1), n(0) : 1
Filter Length (taps) : 35
Setting up grid...
Initializing extremal frequencies...
Performing Remez exchange algorithm...
Calculating impulse response...
*********************************
Finite Impulse Response (FIR)
Linear Phase Digital Filter Design
Using Remez Exchange Algorithm
Hilbert Transformer
Filter Length =  35
                      Band  1           Band  2           Band  3        Band
Lower Band Edge    0.000000000       0.052083332       0.500000000
Upper Band Edge    0.000000000       0.447916657       0.500000000
Desired Value      0.000000000       1.000000000       0.000000000

Weighting          1.000000000       1.000000000       1.000000000
Deviation          0.001044481       0.001044481       0.001044481
Deviation in dB  -59.621986389       0.009067779     -59.621986389

Save Filter? y(1), n(0) : 0
Float,      Rip= 0.0000, Rip= 0.0000, Rip= 0.0000
Bits Start : 0
Another Filter? y(1), n(0) : 0
```

FIG. 11c

```
nero% parks
Filter Types
   1 - Bandpass (and Lowpass)
   2 - Differentiator
   3 - Hilbert transform
   4 - Read grid from file
Enter Type : 3
Sampling Frequency   : 960
Number of Pass/Stop Bands : 3
Band Edges (min, max) : 0,0,40,440,480,480
Response for Each Band : 0,1,0
Weighting Function for Each Band : 1,1,1
Grid Factor (nominal=16) : 16
Filter Length (taps) : 35
Setting up grid...
Initializing extremal frequencies...
Performing Remez exchange algorithm...
Calculating impulse response...
*******************************
Finite Impulse Response (FIR)
Linear Phase Digital Filter Design
Using Remez Exchange Algorithm
Hilbert Transformer
Filter Length = 35
```

|                  | Band 1         | Band 2         | Band 3         | Band |
|------------------|----------------|----------------|----------------|------|
| Lower Band Edge  | 0.000000000    | 0.041666668    | 0.500000000    |      |
| Upper Band Edge  | 0.000000000    | 0.458333343    | 0.500000000    |      |
| Desired Value    | 0.000000000    | 1.000000000    | 0.000000000    |      |
| Weighting        | 1.000000000    | 1.000000000    | 1.000000000    |      |
| Deviation        | 0.003759507    | 0.003759507    | 0.003759507    |      |
| Deviation in dB  | -48.497383118  | 0.032593403    | -48.497383118  |      |

```
Save Filter? y(1), n(0) : 0
Float,    Rip= 0.0000, Rip= 0.0000, Rip= 0.0000
Bits Start : 0
Another Filter? y(1), n(0) : 1
Filter Length (taps) : 39
Setting up grid...
Initializing extremal frequencies...
Performing Remez exchange algorithm...
Calculating impulse response...
********************************
Finite Impulse Response (FIR)
Linear Phase Digital Filter Design
Using Remez Exchange Algorithm
Hilbert Transformer
Filter Length = 39
```

|                  | Band 1         | Band 2         | Band 3         | Band |
|------------------|----------------|----------------|----------------|------|
| Lower Band Edge  | 0.000000000    | 0.041666668    | 0.500000000    |      |
| Upper Band Edge  | 0.000000000    | 0.458333343    | 0.500000000    |      |
| Desired Value    | 0.000000000    | 1.000000000    | 0.000000000    |      |
| Weighting        | 1.000000000    | 1.000000000    | 1.000000000    |      |
| Deviation        | 0.002110878    | 0.002110878    | 0.002110878    |      |
| Deviation in dB  | -53.510738373  | 0.018315190    | -53.510738373  |      |

```
Save Filter? y(1), n(0) : 0
Float,    Rip= 0.0000, Rip= 0.0000, Rip= 0.0000
Bits Start : 0
Another Filter? y(1), n(0) : 1
Filter Length (taps) : 43
Setting up grid...
Initializing extremal frequencies...
Performing Remez exchange algorithm...
Calculating impulse response...
********************************
Finite Impulse Response (FIR)
Linear Phase Digital Filter Design
Using Remez Exchange Algorithm
```

FIG. 12a

```
Hilbert Transformer
Filter Length =   43
                      Band   1          Band   2          Band   3          Band
Lower Band Edge    0.000000000       0.041666668       0.500000000
Upper Band Edge    0.000000000       0.458333343       0.500000000
Desired Value      0.000000000       1.000000000       0.000000000

Weighting          1.000000000       1.000000000       1.000000000
Deviation          0.001186507       0.001186507       0.001186507
Deviation in dB  -58.514591217       0.010299613     -58.514591217

Save Filter? y(1), n(0)  : 0
Float,      Rip= 0.0000, Rip= 0.0000, Rip= 0.0000
Bits Start : 0
Another Filter? y(1), n(0)  : 0
```

FIG. 12b

WIDEBAND PARALLEL PROCESSING DIGITAL TUNER

STATEMENT REGARDING FEDERALLY SPONSORED DEVELOPMENT

This invention was made with U.S. Government support under Contract No. F04701-97-C-0025, "Advanced EHF EM Processor", awarded by the United States Air Force Space & Missiles Command. The U.S. Government has certain rights in this invention.

BACKGROUND OF THE INVENTION

1. Field of the Invention

This invention relates generally to tuner circuits in data communications systems. In particular, the present invention relates to a wide-band digital tuner in a communications satellite.

2. Description of Related Art

A tuner, in general, is capable of down converting from any frequency within a specified frequency range. The tuners in satellite data transmission systems are usually analog or digital with a single serial input received from the output of an analog-to-digital converter (ADC).

The basic structure of a prior art tuner used in a communications satellite is illustrated in the block diagram of FIG. 1. An output signal $IF_{in}$ which has been shifted down in frequency to an intermediate frequency, is applied to analog to digital converter (ADC) 12 which digitizes the signal $IF_{in}$ into an output containing a large number of samples at a high rate.

The tuner 14 receives the digitized signal $IF_{in}$ outputted by the analog to digital converter 12 and processes it into quadrature signal processing paths 16 and 18 which each contain a frequency converter 20 which downwardly shifts the input signal $IF_{in}$ to a lower frequency. The frequency converters 20 of the I signal processing path 16 and the Q signal processing path 18 respectively receive input carriers $COS(\omega T)$ and $SIN(\omega T)$ from the quadrature digital sinewave generator which cause the frequency converters to produce the quadrature I and Q signals which are downshifted in frequency to a lower carrier frequency. The input to the quadrature digital sinewave generator 22 is a frequency command $F_{in}$ which commands the quadrature digital sinewave generator 22 to output the quadrature carriers $COS(\omega T)$ and $SIN(\omega T)$ of the appropriate frequency to cause the frequency converters to shift the input signal $IF_{in}$ to the lower carrier frequency for further signal processing. The envelopes of the lower frequency quadrature carriers produced by connection of $COS(\omega T)$ and $SIN(\omega T)$ to the frequency converters 20 are modulated with the quadrature components of data present in the intermediate frequency input signal $IF_{in}$. The outputs from the frequency converters 20 are applied to suitable low pass filters 24 which attenuate frequency components outside the desired lower carrier frequency band to which the I and Q data components are shifted. (Alternatively, tuner 14 could utilize bandpass filters instead of lowpass filters 24.) The output I and Q signals are applied to downstream demodulator processing 26 of a conventional nature including channelization, discrete Fourier transformation (DFT) and other known signal processing techniques.

The bandwidth of tuner 14 is limited and switching between multiple IF frequencies is typically accomplished before the payload is converted in ADC 12 to the single serial digital signal provided to tuner 14. These multiple IF frequencies may, but need not, be located at uniformly-spaced positions in frequency. The process of switching between different IF frequencies is sometimes referred to as "hopping". For security purposes, hopping is often performed in a quick random pattern known only to the transmitting and receiving stations. Analog components impart the disadvantages of signal attenuation, heightened noise and lower reliability. These problems are exacerbated when the data transmission system utilizes frequency hopping among different channels.

Most tuners do not operate well at the high rates associated with wideband signals in the gigabit per second range. Channelizers, in particular, are commonly used to separate an input wideband signal of a specific spectrum received from an antennae into a plurality of narrowband channels. The wideband signal may carry different channels using different frequency bands, different time slots, different spread spectrum coding, or a combination of any two or more of these techniques. The channelizers may be wideband channelizers and/or narrowband channelizers used to separate a wideband signal into smaller sections of constituent channels.

The channel distribution in a wideband satellite communications application may be a plurality of 2 GHz channel groups, each comprised of twenty (20) 100 MHz sub-band channels, or 320 MHz channel groups, each comprised of four (4) 80 MHz sub-band channels. Each sub-band channel in these implementations may be channelized into smaller sections of narrower band channels, such as, for example, four (4) narrowband channels of 20 MHz each. Of course, neither the wideband nor the narrowband signals are limited to any particular spectral range and may separately determined for different applications.

BRIEF SUMMARY OF THE PREFERRED EMBODIMENTS

A preferred application of the present invention is in a wideband satellite communications system transmitting payload data over a number of different frequency channels at extremely high data rates. However, it also has application to any frequency-hopped communications system in which the transmitted waveform requires dehopping. Furthermore, it may be used to prepare channel information from a waveform containing channels at non-uniformly spaced frequencies.

In an exemplary implementation of the present invention, a communications satellite has an analog front-end, an ADC located functionally "closer" to the antennae, and a serial-to-parallel converter, also known as a demultiplexer or demux, providing several digital output signals in parallel. The analog front-end is simplified to perform a coarse tuning or "de-hop", thus avoiding many of the disadvantages associated with the conventional analog front-end. The ADC is a modern commercially available unit or a specially designed unit able to sample at extremely high speed data rates. The single input from the ADC is quickly switched by the demux to a number of output branches. Each output switch outputs at a slower rate than the ADC even though the aggregate rate remains the same. This reduction in data sampling rate permits the processing of wide bandwidth signals resulting from coarse tuning.

The fine tuning is performed in an advanced digital tuner receiving the plurality of parallel digital signals inputs from the demultiplexer. Parallel architecture and processing in the advanced digital tuner allows the high sample rate data to be processed at a much slower clock rate. The digital tuner filters out half of the spectrum with a complex bandpass filter, such as a Hilbert Transform filter, and down converts the other half to complex baseband. An alternative architecture would allow downconversion first and then filtering out half of the spectrum with a half-band filter. Because the "half-spectrum" is less than one-half of the Nyquist rate, the tuner can down sample by 2 and no aliasing occurs. This prepares the output signal from the tuner for downstream demodulator processing such as channelization and data detection

BRIEF DESCRIPTION OF THE DRAWINGS

The foregoing and a better understanding of the present invention will become apparent from the following detailed description of the preferred embodiments and the claims when read in connection with the accompanying drawings. While the foregoing and following written and illustrated disclosure focuses on disclosing preferred embodiments of the invention, it should be clearly understood that the same is by way of illustration and example only and is not to be taken by way of limitation, the spirit and scope of the present invention being limited only by the terms of the claims in the patent issuing from this application.

FIG. 5 is a computer program run of 15-tap and 19-tap half-band filters for the first exemplary embodiment shown in FIG. 3.

FIGS. 9a–9e are diagrams helpful for illustrating the frequency band operation of the second exemplary embodiment shown in FIG. 7.

FIG. 10 is a computer program run of a 19-tap Hilbert Transform filter for the second exemplary embodiment shown in FIG. 7.

FIGS. 11a–11c are computer program runs of a series of Hilbert Transform filters for the second exemplary embodiment, each having between 19 and 35 taps.

FIGS. 12a and 12b are computer program runs of a 35-tap Hilbert Transform filter having a 10 MHz IF offset.

DETAILED DESCRIPTION OF THE PREFERRED EMBODIMENTS

Before describing in detail preferred embodiments of a wideband digital tuner in accordance with the present invention, it should be observed that the invention involves a novel combination of filter components, controls, functions and operations as well as structure. Accordingly, the block diagram illustrations of the figures representing the preferred embodiments do not necessarily represent a limiting, or even exemplary, structural arrangement of the invention, but may merely convey the functional and operational aspects of the invention in a manner which makes them apparent to those skilled in the art.

Figure 1:
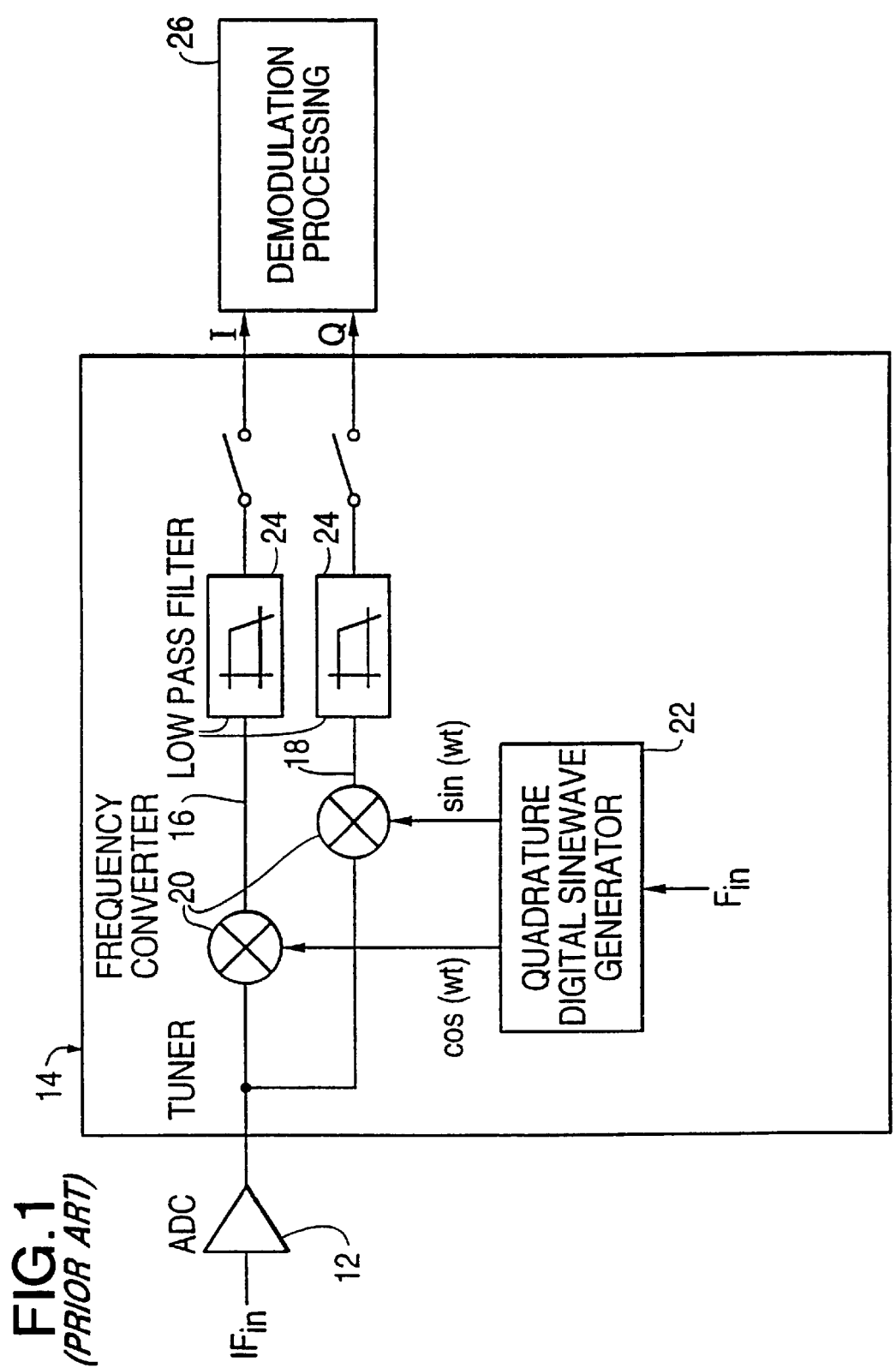
FIG. 1 is a block diagram of a tuner known in the prior art.
Figure 2:
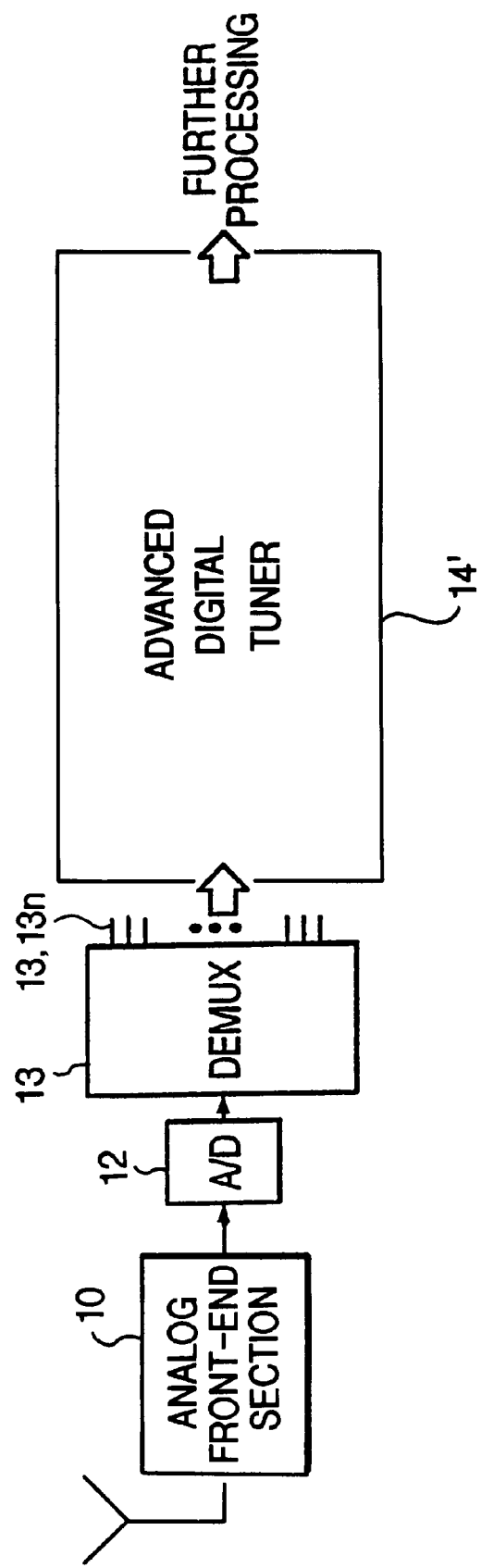
FIG. 2 is a generalized block diagram of the relevant major components of a wideband communications receiver.

FIG. 2 is a block diagram of the major components of the receiving circuitry in a wideband communications device such as, but not limited to, a satellite. Several types of input devices may be used for intercepting or capturing electromagnetic radiation for subsequent input and down conversion in the exemplary receiver. Examples of such input devices may include antennas, waveguides, coaxial cables, optical fibers, or infrared frequency transducers.

As shown in FIG. 2, an exemplary wideband, high data rate, communications satellite receiver may comprise an analog front end section 10 which downconverts the received frequencies and extracts a selected frequency spectrum. The passed wideband signal may inherently contain a plurality of narrowband channels. The analog front end section 10 may be controlled in such a manner that it sequentially selects frequency spectrums of interest to carry out a hopping procedure. It also performs a coarse tuning of the received frequencies. A high-speed ADC converter 12 samples the wideband signal at a sampling rate set within the Nyquist criterion of at least twice the highest desired frequency to produce a digitized signal. The digitized signal may be represented by a sequence of n-bit data samples, where n>0. The sequence of n-bit data samples produced by ADC 12 is input to demultiplexer 13, which may produce a plurality of parallel data outputs $13_1$–$13_n$. The demultiplexer may be implemented as a multiple tapped delay line with each parallel output being outputted from a different tap of the delay line. The input samples of the demultiplexer are inputted serially at the ADC sampling rate and outputted in parallel at a slower rate. The demultiplexed data outputs $13_1$–$13_n$ of the demultiplexer 13 may be applied to an advanced digital tuner 14' constructed according to the principles of the present invention. The advanced digital tuner 14' converts the demultiplexed data outputs $13_1$–$13_n$ of the demultiplexer 13 from real data to complex (real and imaginary) data representations. The output of advanced digital tuner 14' can be forwarded, for example, to a channelizer for separation into a plurality of narrowband channels, where each narrowband channel may convey one of the channels conveyed by the wideband signal, and/or to other types of signal processing circuits (not shown).

The advanced digital tuner 14' uses a parallel architecture of filter blocks to process digital data from ADC 12 at sample rates which are, for example, in the gigabit per second range. The sample rates may be higher or lower, of course, depending on the speed of the implementing technology. Functionally, a filter block encompasses a filter which greatly attenuates nearly one half of the wide bandwidth digital spectrum of the incoming digital signal, places the remaining half at complex baseband and down samples by 2. There is no aliasing since the complex baseband signal is less than one-half the Nyquist rate and since the filter greatly attenuates the spectrum where aliasing would have occurred. A detailed description of the parallel architecture of tuner 14' is provided later in this description. But first, two separate embodiments of the filter blocks utilized in the parallel architecture are now described.

Figure 3:
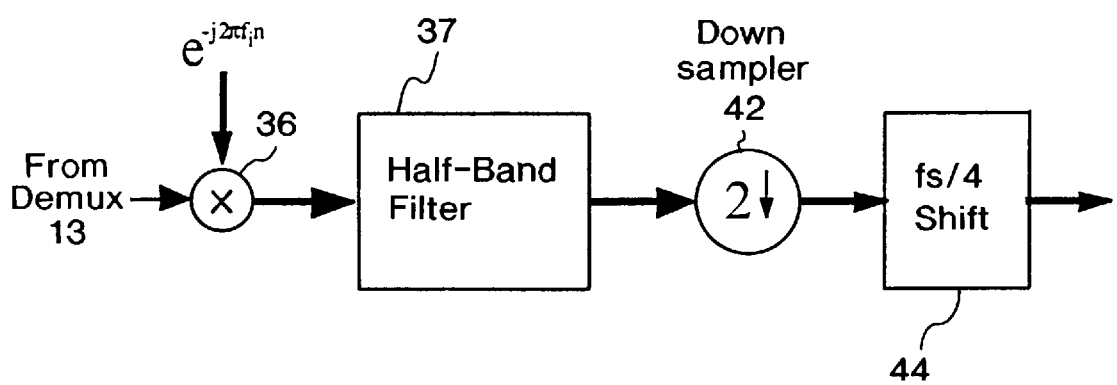
FIG. 3 is a block diagram illustrating a first exemplary embodiment of a filter block in advanced digital tuner 14' of the receiver shown in FIG. 2.

A first exemplary embodiment of a filter block in advanced digital tuner 14' according to the present invention is illustrated in a simplified form in FIG. 3. It should be understood that separate I and Q channels are present in FIG. 3 but have been omitted to simplify the illustration.

The filter block in FIG. 3 receives only one stream of samples from the output signals 13$_1$–13$_n$ of demultiplexer 13 as an input data signal. (The branches of demultiplexer 13 provide an interleaved stream of samples, e.g., x0, x4, x8, x12, etc. for a 1-to-4 DEMUX.) The input data signal is applied to a frequency converter 36 where it is multiplied by a complex sinusoidal waveform to shift it to a lower carrier frequency. The signal is then filtered by a halfband filter (HBF) 37, a special lowpass filter as exemplified in FIG. 5. The output of halfband filter 37 is then down sampled by 2 in down sampler 42. Finally, the signal undergoes a selected frequency shift in F$_s$/4 shift circuit 44.

Figure 4A:
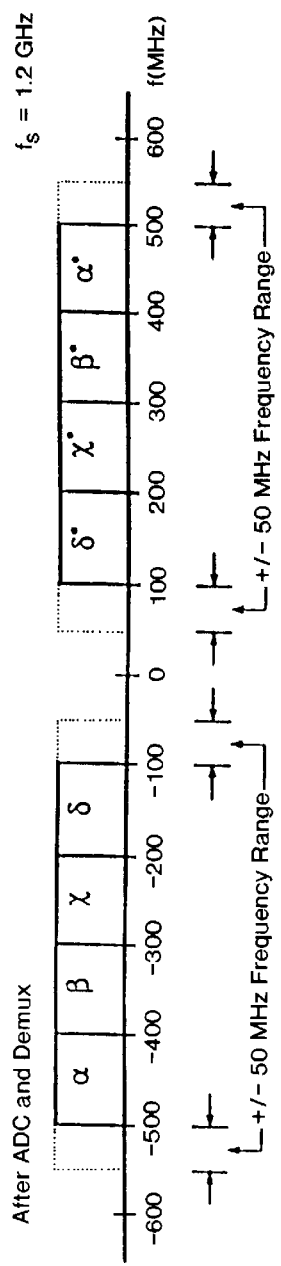
FIGS. 4a–4d are diagrams helpful for illustrating the frequency band operation of the first exemplary embodiment shown in FIG. 3.
Figure 4B:
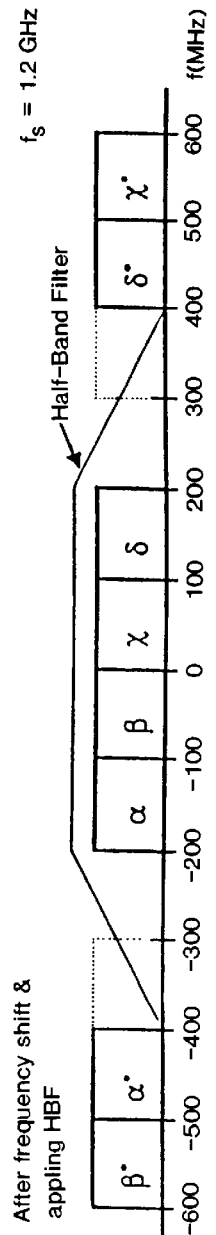
Figure 4C:
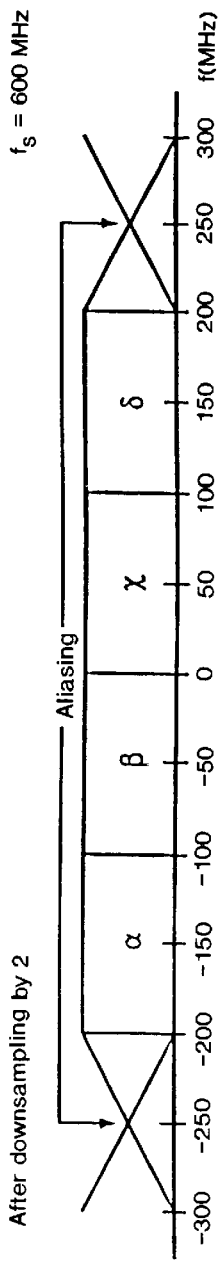
Figure 4D:
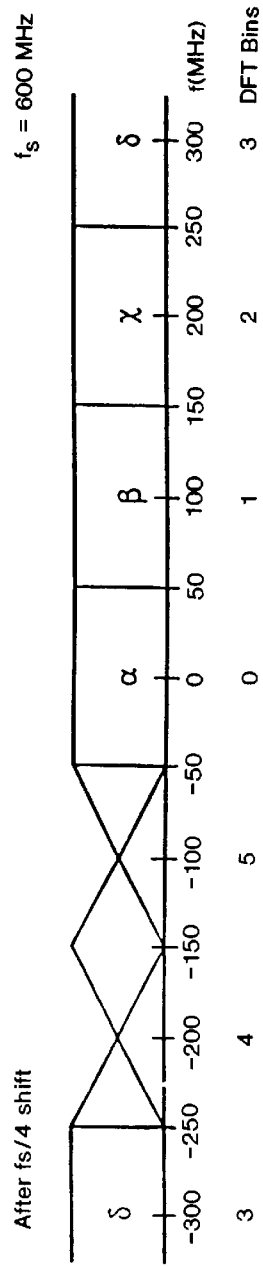

The frequency band operation of the first embodiment is illustrated in FIGS. 4a–4d. FIG. 4a shows the frequency band content of the input signal to the filter block after the ADC and demuxing operations. FIG. 4b shows the band content after the frequency shift (multiplying by sinusoid) and applying of the HBF 37. FIGS. 4c and 4d then show the bands after down sampling and F$_s$/4 shift.

FIG. 5 shows the transcripts of two runs of a computer program used to design and create the half-band filter 37 using the Chebyshev (equi-ripple) error criterion and the Parks-McClellan algorithm. The runs show the respective characteristics of 15-tap and 19-tap half-band filters with equal single-sided 160 MHz pass band, transition band, and stop band. The 15-tap filter has a 0.03 dB pass band ripple and −49.1 dB stop band rejection, while the 19-tap filter has a 0.01 dB pass band ripple and a −59.5 dB stop band rejection.

Figure 6:
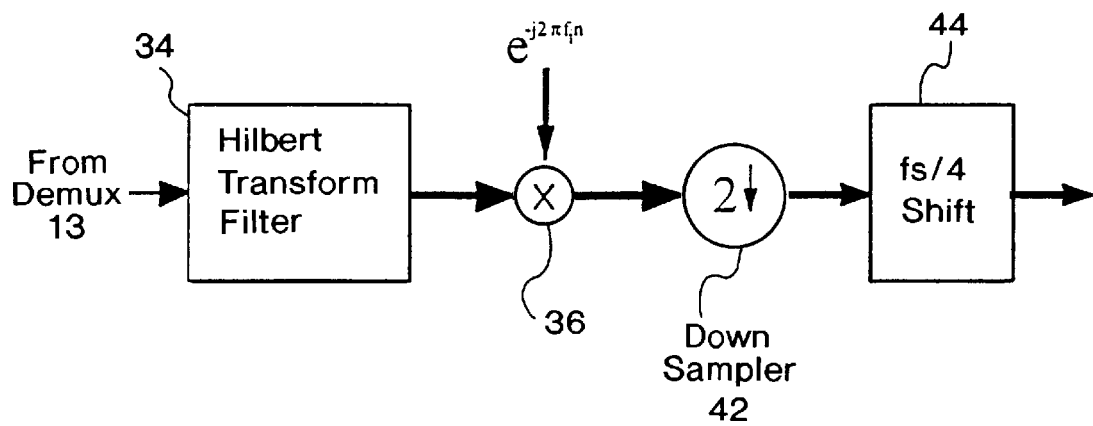
FIG. 6 is a simplified block diagram of a second exemplary embodiment of a filter block in advanced digital tuner 14' of the receiver shown in FIG. 2.
Figure 7:
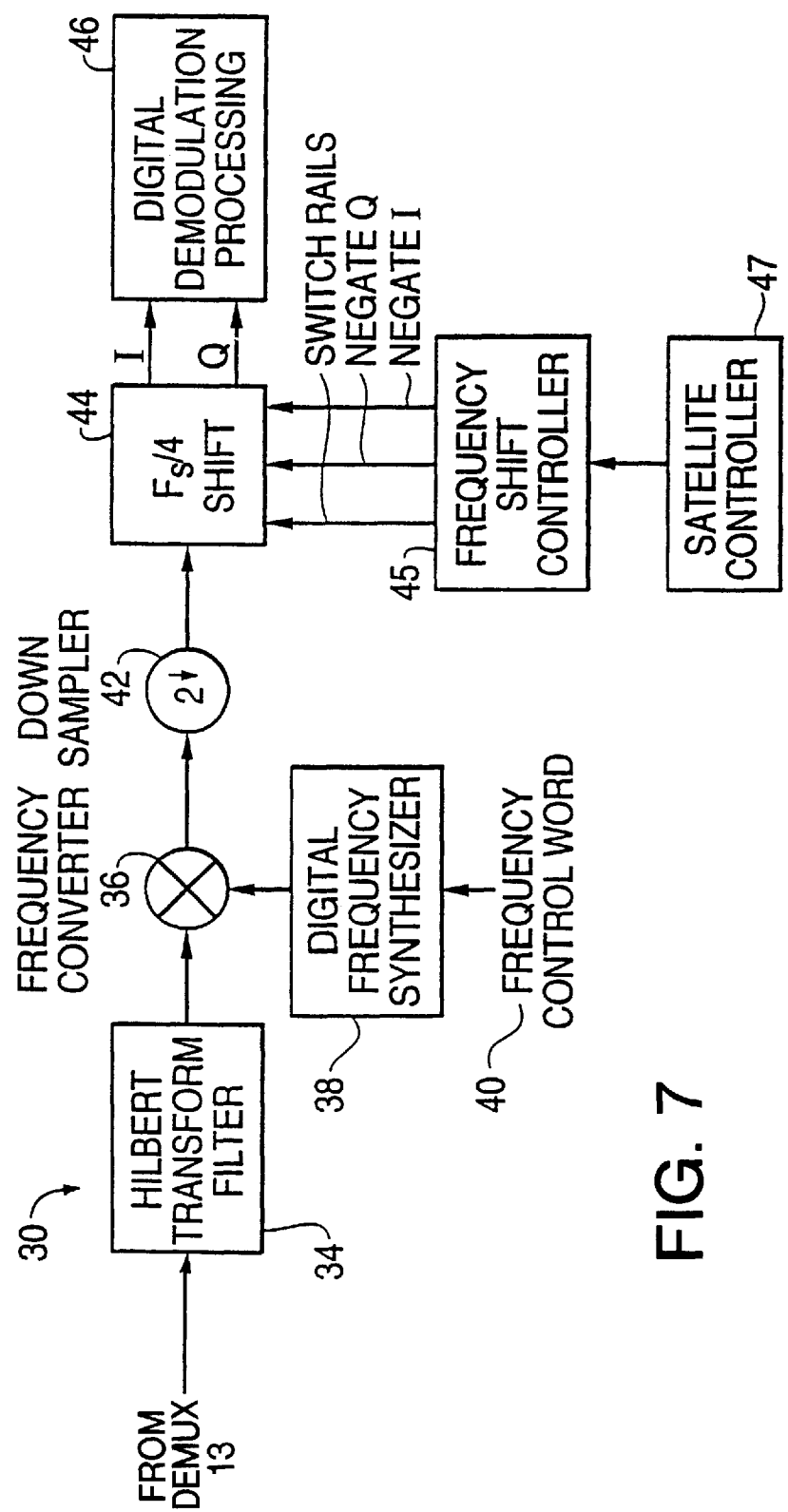
FIG. 7 is a more detailed block diagram of the second exemplary embodiment in FIG. 6.

A second preferred embodiment of the filter block of an advanced digital tuner according to the present invention is illustrated in simplified form in FIG. 6. It is similar to the first embodiment except that it uses a Hilbert Transform Filter (HTF) 34 before the frequency converter 36, instead of a half-band filter 37 after the frequency converter 36. In order to help explain the advantages of this second embodiment of the basic filter block which makes it generally preferable over the first embodiment, a more detailed diagram is provided in FIG. 7.

Hilbert Transform Filters are known to those in the art. The Hilbert Transform Filter (HTF) 34 converts real data input signals 13$_1$–13$_n$ into complex data signals with real and imaginary components, and greatly attenuates nearly one half of the wideband digital spectrum of the signal. The Hilbert Transform defines the relationship between the real and imaginary parts of the Fourier Transform of a complex signal (where its Fourier Transform over the range, −π<ω<0, equals zero). This relationship takes the form, $$X_i(\omega) = H(\omega)X_r(\omega),$$

$$\text{where } H(\omega) = \begin{cases} -j, & 0 < \omega < \pi \\ j, & -\pi < \omega < 0. \end{cases}$$

In other words, the imaginary part of the Fourier Transform of a complex signal is the real part phase-shifted by −90 degrees. Therefore, to create a complex signal from a real signal, the real signal is simply passed through an HTF with the above response. The output represents the imaginary part of the newly created complex signal. The original signal is delayed by the group delay of the HTF and is used as the real part of the final output. In the frequency domain, the created signal has a one-sided spectrum, equivalent to one side of the original signal's spectrum.

At least one digital frequency synthesizer 38 in the filter block supplies digitally synthesized quadrature sinusoidal waveforms, representing a complex exponential, to the frequency converter 36. The sinusoids are then multiplied with the data output from HTF 34 to modulate them downwardly to complex baseband. The particular specified frequency to which the data outputted from HTF 34 is shifted down is specified by the input FREQUENCY CONTROL WORD 40. As a consequence of the filtering function performed by the Hilbert transform filter 34 eliminating nearly half the digital data bandwidth and by the frequency converter 36 downshifting the filtered data, the output from the frequency converter is down sampled by a factor of 2 by the down sampler 42 which eliminates the excess half of the data samples. The circuit thus operates as a decimation as well as a tuner.

Figure 8:
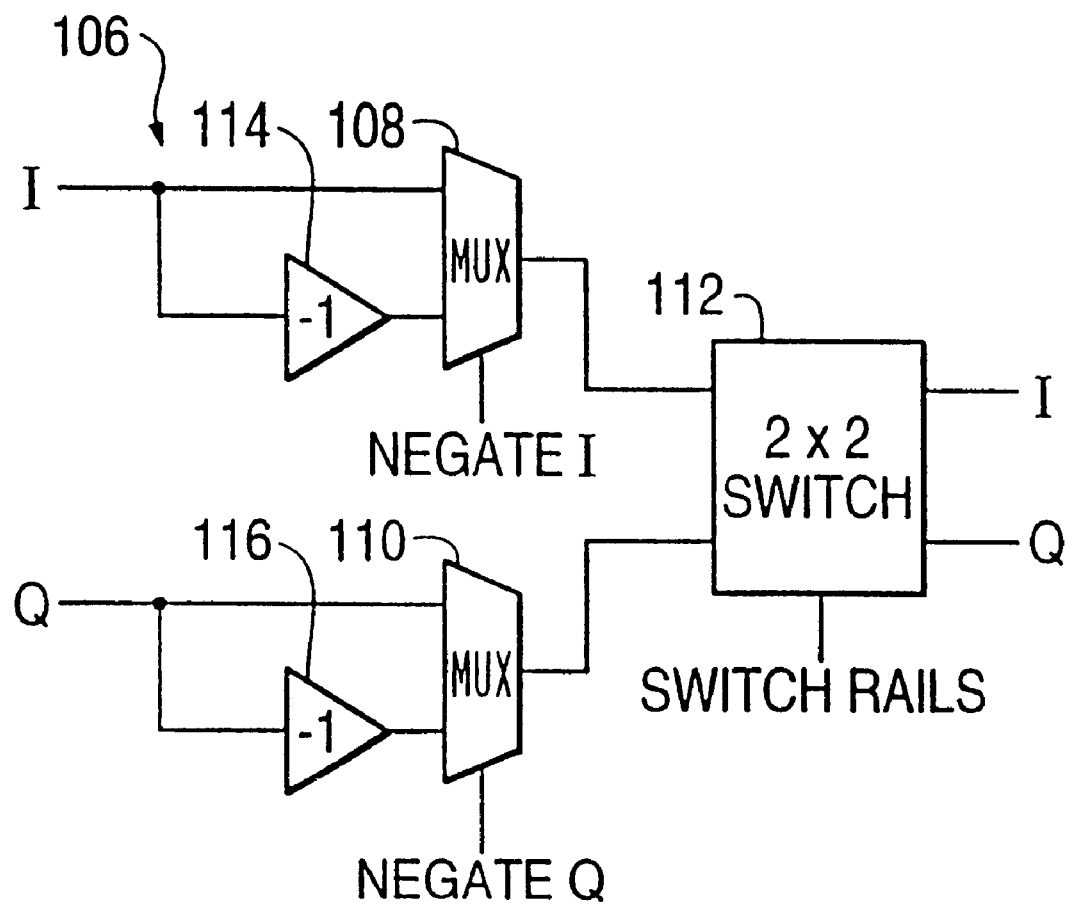
FIG. 8 is a block diagram of an implementation of a frequency shift 44 used in the second exemplary embodiment shown in FIG. 7.

The output of down sampler 42 is applied to a frequency shift 44 which shifts up the frequency of the output from the down sampler 42 by a frequency shift equal to one quarter of data sampling rate F$_s$. A frequency shift controller 45 produces control signals SWITCH RAILS, NEGATE Q and NEGATE I which operate in accordance with the relationship set forth in the table below to produce a cyclical output of +1, +j, −1 and −j which is clocked at the data sampling rate F$_s$. The circuitry for generating the control signals is discussed below in conjunction with FIG. 8.

| Multiplier | Control Signals |
| --- | --- |
| +1 | do not negate, nor swap rails |
| +j | negate Q-rail, swap rails |
|  | (i.e. I and Q are switched) |
| −1 | negate both rails, do not swap rails |
| −j | negate I-rail, swap rails |

The frequency shift 44 outputs I and Q data signals which are shifted to a correct frequency position to align the I and Q data in frequency with channels to be produced by a channelizer (not shown).

For spectral efficiency and to prevent aliasing due to the down sampler 42, the digital spectrum produced by the frequency conversion 36 has channels positively and negatively spaced about baseband but does not have a channel at baseband. A channelizer requires alignment of the input data with a channel centered at baseband in order to function properly. By appropriate control and selection of the multipliers, the frequency shift 44 is further capable of performing a frequency shift equal to one quarter, one half, or zero, of the data sampling rate F$_s$, where F$_s$ is the data sample rate of data outputted from the down sampler 42. The frequency shift is flexible in terms of which frequencies it can shift to and from. It positions the waveform for the next stage, such as channelization.

The frequency band operation of the second embodiment is illustrated in FIGS. 9a–9e. FIG. 9a shows the frequency band content of the input signal to the filter block after the ADC and demuxing operations. FIG. 9b shows the band content after applying HTF 34. FIG. 9c shows the band content after frequency shift (multiplying by sinusoid). FIGS. 9d and 9e then show the bands after down sampling and F$_s$/4 shift, respectively.

FIG. 10 is a transcript of a run of the same computer program utilized in FIG. 5, and shows a Hilbert Transform Filter with the same two-sided pass band bandwidth and 19 taps as the half-band filter in the first embodiment of the filter block. The pass band ripple and stop band rejection are slightly worse than those of the first embodiment. FIGS.

11A–11C are run transcripts which show how many taps are required to achieve the filter characteristics of the 19-tap half-band filter of the first embodiment. It can be seen that the run extends from 19 taps to 35 taps in order to achieve nearly identical filter characteristics. (The number of taps increases by 4 for iterative filter design because the filters have zero, or near-zero tap values for every other tap and the filters are symmetric, adding two taps adds only zeroes to the filters, causing no change in the filter response.) FIGS. 12A and 12B take into consideration a 10 MHz offset and widens the pass band. Although HTF 34 can be made into a general, non-symmetric, complex band-pass filter, then every tap value will become non-zero, implying a large increase in hardware for implementation.

The second embodiment of the filter block exploits the symmetry and zero-valued-taps of the Hilbert Transform Filter as well as the down sampling by 2 to achieve an efficient implementation, provide a more compact filter design (lower gate count) and more efficient power usage. The down sampling and filter characteristics also provide a method of efficient input ordering and data storage. Furthermore, the tuner can be partitioned such that only half of the implementation requires a unique design. The other half is a hardware copy of the first, thereby shortening design and test time.

As mentioned previously, an important feature of the preferred embodiments of tuner 14' is the parallel architecture in which the filter blocks are implemented. Obviously, a respective filter block could be provided for an equal number of the output signals $13_1$–$13_n$ of the demultiplexer 13 input to the tuner 14'. However, in such a case the number of filter blocks (and hence filters, frequency synthesizers, multipliers, etc.) would be equal to the number of output signals of demultiplexer, which could raise some disadvantages. Of course, it could always be decided that the number of filter blocks is either greater than, equal to, or less than the number of output signals of the demultiplexer.

Consequently, the tuner 14' in accordance with the preferred embodiments of the invention utilizes a strategic combination of elements rather than the mere repetition of a filter block for each signal input into the tuner. Furthermore, the tuner operates in a pipeline fashion. As one sample enters a filter as input, one output sample must be generated. The filter blocks in tuner 14' span multiple input samples in each clock cycle to generate that single output sample. The invention parallelizes the processing by having many filters operating on data simultaneously. The tuner store those samples it needs to determine the outputs of the parallel processed filters in a collection of sample registers and each filter spans a multiple number of input samples from different output branches of demultiplexer 13.

Figure 13A:
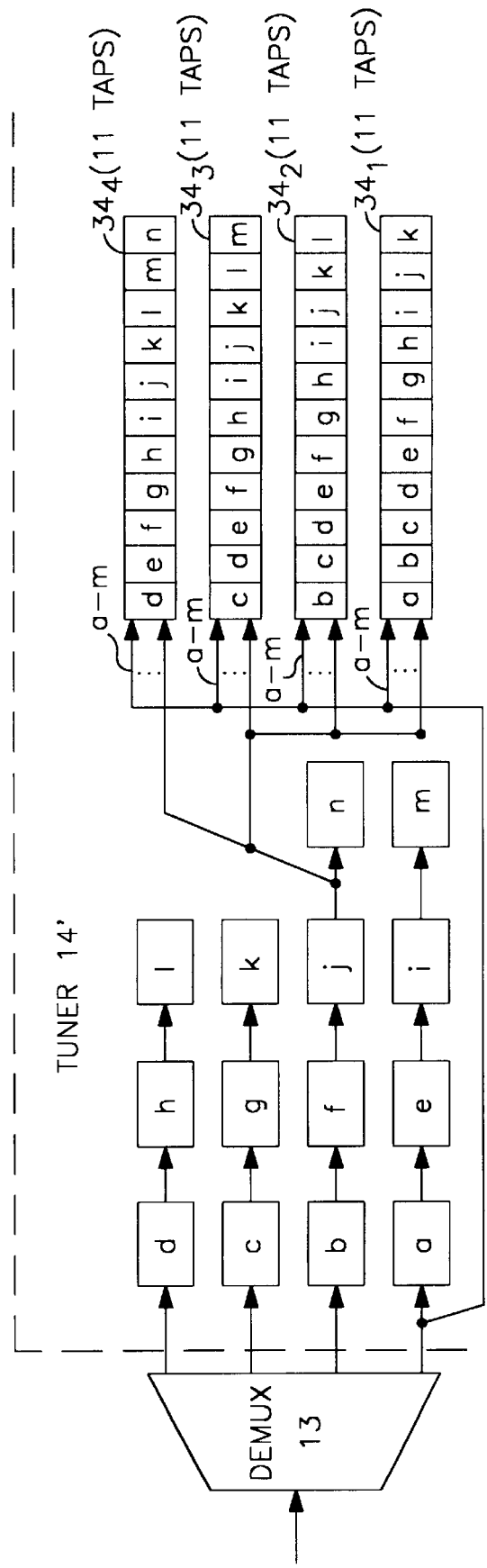
FIGS. 13a and 13b are partial detailed diagrams of an exemplary embodiment of advanced digital tuner 14'.
Figure 13B:
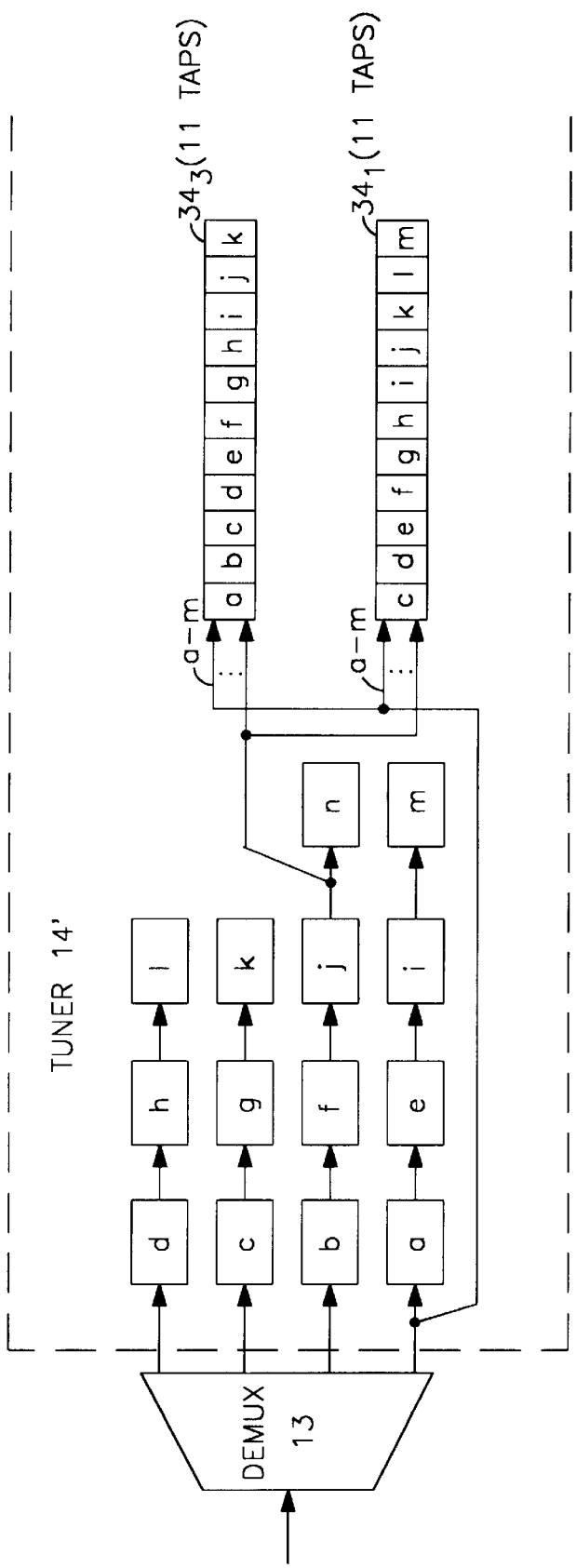

Exemplary embodiments of tuner 14' are shown in FIGS. 13a and 13b. For the sake of simplicity in the drawings and description, applicants have assumed that demultiplexer 13 is a 1-to-4 demultiplexer having only four (4) output signals and that HTF filters 34 have only 11 taps. The tuner includes a number of sample registers, each sample register connected to a respective output signal of demultiplexer 13 or in series to a sample register connected to a respective output signal of demultiplexer 13. As a group of four samples are read into the first sample register in a series of sample registers, the samples are read out of the last sample register in a series of sample registers. If one output sample is processed for every input sample, a succession of filtering operations can be obtained which are shifted by one input sample. A group of four successive outputs can be obtained all at the same time as long as there are sufficient and the input samples can feed those filtering operations. (It is impossible to filter individual branches of the DEMUX, since the DEMUX branches would provide interleaved samples, e.g., x0, x4, x8, x12, etc. for a 1-to-4 DEMUX.)

Assuming that demultiplexer 13 simply provides a series of sequential samples (a–m) in time multiplexed fashion, the sample registers store the samples respectively as shown in FIGS. 13a and 13b. This process of storing the samples creates a bank of samples so that they can be provided at the appropriate time to the appropriate filter. Although not shown in its entirety in FIGS. 13a and 13b, a connection matrix is formed so that the sample stored in each sample register can be selectively provided to any one of the Hilbert Transform Filters. The samples are then provided to the Hilbert Transform filters at the proper timing and input position. Once the configuration of the tuner is set (in terms of the number of branches from demultiplexer 13, the number of filters 34, and the number of taps in each filter), the sequence of connections can be determined and the connection matrix controlled so that the proper order and sequence of connections is carried out.

Without down sampling, four filters are utilized as shown in FIG. 13a. If four input samples came into the filters from the DEMUX, implying that the filter rate is 4 times slower than the ADC sampling rate, then 4 output samples need to be determined during that same time to prevent data overflow or underflow. Not all 10 samples are used in every filter, and potentially need to be stored for the next cycle of filter operations. This is implemented in the switch fabric for linking the correct input samples to the appropriate filters.

However, advantages can be obtained by accomplishing down sampling in combination with the filter operations. With down sampling, the number of output samples generated is reduced by the decimation factor, M. This reduces the number of filter operations that need to be performed every clock cycle. Continuing from the previous example, if M=2, only 2 filters need to be calculated for the 4 input samples entering the filters since only 2 output samples are kept anyway; the other 2 are dropped by down sampling. This is shown in FIG. 13b. Thus, repetitive filter operations can be eliminated in the parallel architecture, even with the multiplication by the complex exponential between the filter and down sampling.

Both Hilbert Transform Filters and Half-Band Filters are symmetric finite-impulse response filters; one half is the mirror image of the other half. Hence, by "pre-folding" the inputs, i.e. adding them appropriately prior to the filtering operation, the number of taps can be reduced by 2. Secondly, if they have an odd number of taps, every other tap has a value of zero. This reduces the number of unique tap values to process by another factor of 2.

Despite there being four output signals from demultiplexer 13, only two (2) Hilbert Transform filters $34_1$ and $34_2$ are provided in FIG. 13b. Rather than providing four filters as in FIG. 13a and then deleting every other sample in a downstream discrete down sampler 42, it is preferable to a priori set the number of filters to accomplish the downsampling. In the case of a down sampling by 2, only two filters need to be provided instead of four. In such a case, the control of the switch matrix delivers the samples to the filters in accordance with the number of filters.

In addition, distributed arithmetic (DA) is preferably used to implement the filters rather than a conventional "multiply-and-add" filter design. All process bits can be processed in one clock cycle. In the DA architecture, frequency shift control can negate filter outputs as necessary when configuring the Hilbert Transform Filter to choose which sideband, positive or negative, is passed and which side-band is rejected.

Furthermore, although there may be a large number of DEMUX output branches and filters, it is also possible to avoid implementing one digital frequency synthesizer for each filter block. The complex exponential that multiplies the signal to down convert it in frequency is preferably implemented with a digital direct frequency synthesizer (DDFS). The DDFS maps a phase index (integers representing phase increments) to the amplitude of a sinusoidal signal having that particular phase. When the phase index increments in constant intervals, a frequency is represented, and the output of the DDFS forms a sinusoidal signal. The DDFS produces both sine and cosine outputs to duplicate the complex exponential.

Although there are a plurality of DDFS operating at one time, a common phase accumulator holds the respective phase index for each DDFS. The input samples are multiplied individually by samples of a sinusoid that represent different phases. In this way, the frequency does not change. Just as the phase interval between any two consecutive samples is identical, the phase interval between samples separated by N samples is identical. Hence, only constant offsets are required for each individual DDFS. Each complex multiplier also has a unique architecture. It does not perform the conventional (ad−bc)+j(ac+bd) computation where 4 multiplies and two adds are necessary. Alternatively, if we have two complex numbers, a+jb and c+jd, their product equals ac−bd+j[ad+bc]. There are 4 multiplication and 2 addition operations in the complex product (disregarding the notational addition between the real and imaginary parts). The same complex product can be generated as such, a(c+d)−(a+b)d+j[b(c−d)+(a+b)d]. This form requires 5 addition operations, but only 3 multiplications since the (a+b)d term is repeated.

Finally, the $F_s/4$ frequency shift circuitry does not have to be redundantly provided for each branch. Since the down sampling may be accommodated in the filtering operations, it is not necessary to provide the entire selectable frequency shift circuit and controller shown in FIG. 8 for each filter output. Instead, it is possible to a priori set the appropriate shift (either 1, −1, j or −j) for each filter branch.

Figure 14:
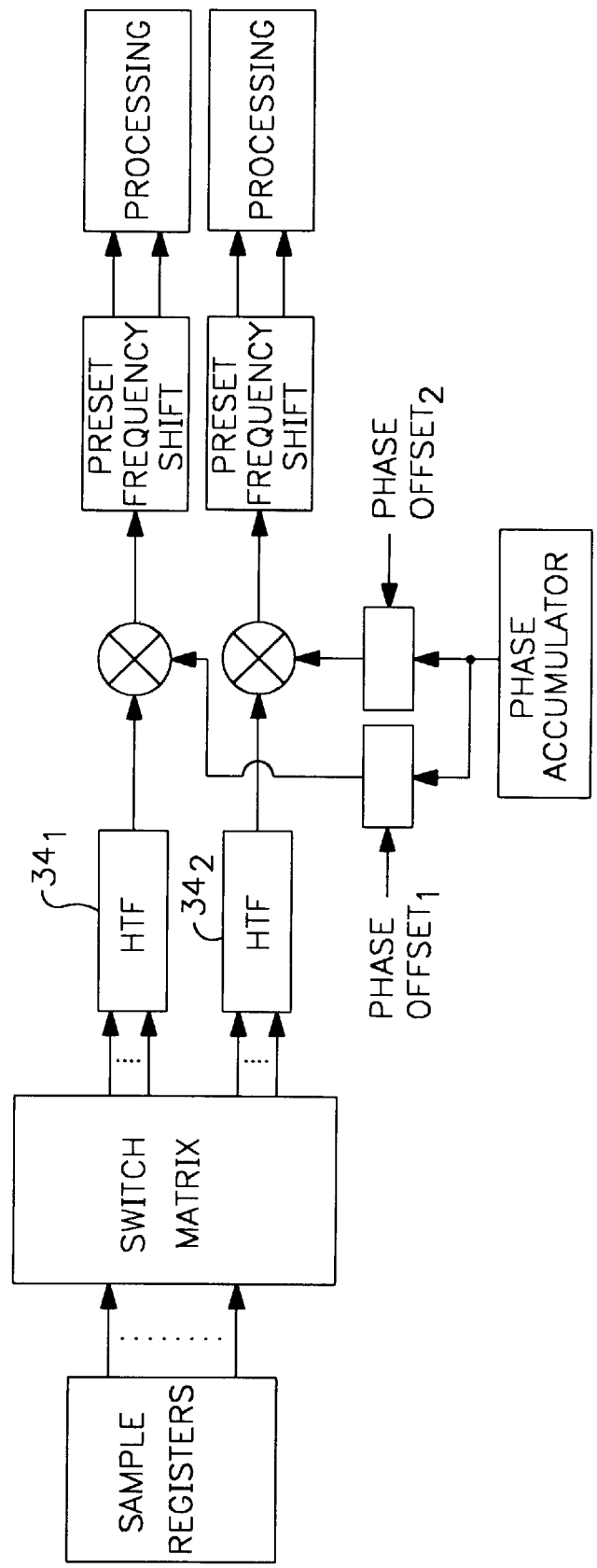
FIG. 14 is a further detailed diagram of an exemplary embodiment of advanced digital tuner 14'.

As can be seen from FIG. 14, despite the fact that multiple input signals are provided from the DEMUX 13 to lower the sampling rate of the ADC 12, the amount of hardware does not have to increase linearly with the increase in the number of input signals from the DEMUX. Indeed, by implementing one of the preferred embodiments discussed above having less in the way of digital frequency synthesizers and filtering operations, redundancy can be reduced. Furthermore, the embodiments can be partitioned such that only half of the implementation requires a unique design. The other half is a hardware copy of the first, thereby shortening design and test time. Finally, significant power savings are realized due to the parallel nature of the implementation, permitting the use of low-speed, low-power technologies such as CMOS.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A wideband digital tuner comprising:
   a demultiplexer circuit receiving a high rate wideband digital signal and outputting a plurality (n) of parallel digital signals, each of the parallel digital signals having a rate which is 1/n the rate of the high rate wideband digital signal;
   a bank of sample registers, each sample register storing one sample of the high rate wideband digital signal;
   a plurality of filters, said plurality of filters attenuating one half of the wideband digital signal spectrum;
   a connection matrix connecting the bank of sample registers and said plurality of filters, the connection matrix simultaneously providing each of said plurality of filters with a respective one of the samples stored in said bank of sample registers; and
   at least two frequency shift circuits, each for shifting the output of one of said plurality of filters.

2. The wideband digital tuner recited in claim 1, wherein said plurality of filters comprise Hilbert Transform filters.

3. The wideband digital tuner recited in claim 1, wherein said plurality of filters comprise complex bandpass filters.

4. The wideband digital tuner recited in claim 1, wherein the number of filters is less than the number of parallel data signals output by the demultiplexer.

5. The wideband digital tuner recited in claim 4, wherein the samples are decimated by down sampling performed by said plurality of filters.

6. The wideband digital tuner recited in claim 1, wherein the frequency shift circuit is configurable to perform a selectable frequency shift.

7. The wideband digital tuner recited in claim 1, wherein the number of filters is equal to the number of parallel data signals output by the demultiplexer.

8. A wideband communications receiver comprising:
   an antenna;
   an analog bandpass filter filtering the analog signal received by the antenna;
   a high speed analog-to-digital converter converting the filtered analog signal to a digital signal;
   a demultiplexer converting the digital signal to a plurality (n) of parallel digital signals, the data rate of the parallel digital signals being 1/n of the rate of the digital signal;
   at least two filters connected to the parallel digital signals, the filters attenuating one half of the wideband digital signal spectrum; and
   at least one processing circuit processing the outputs of said at least two filters.

9. A wideband communications receiver as recited in claim 8, further comprising a connection matrix connecting the bank of sample registers and said at least two filters, the connection matrix simultaneously providing each of said at least two filters with a respective one of the samples stored in said bank of sample registers; and
   at least two frequency shift circuits, each for shifting the output of one of said at least two filters.

10. The wideband communications receiver recited in claim 9, wherein the frequency shift circuit is configurable to perform a selectable frequency shift.

11. The wideband communications receiver recited in claim 8, wherein said at least two filters comprise Hilbert Transform filters.

12. The wideband communications receiver recited in claim 8, wherein said at least two filters comprise complex bandpass filters.

13. The wideband communications receiver recited in claim 8, wherein the number of filters is less than the number of parallel data signals output by the demultiplexer.

14. The wideband communications receiver recited in claim 13, wherein the samples are decimated by down sampling performed by said at least two filters.

15. The wideband communications receiver recited in claim 8, wherein the processing circuit comprises a channelizer.

16. The wideband communications receiver recited in claim 8, wherein the receiver sequentially switches between a number of different frequencies.

17. The wideband communications receiver recited in claim 16, wherein the analog bandpass filter performs a coarse tuning and said at least two filters perform a fine tuning of the signal passed by the analog bandpass filter.

18. The wideband communications receiver recited in claim 8, further comprising a plurality of complex multiplexers respectively corresponding to the plurality of filters and placing the remaining half of the incoming wideband digital signal spectrum at complex baseband, at least one complex multiplexer being configured to perform only 3 multiplication operations.

19. The wideband communications receiver recited in claim 18, wherein each one of the plurality of complex multiplexers comprises a digital frequency synthesizer, the digital frequency synthesizers sharing a common phase accumulator.

20. The wideband communications receiver recited in claim 8, wherein the number of filters is equal to the number of parallel data signals output by the demultiplexer.

* * * * *